(12) United States Patent
Ashliman

(10) Patent No.: US 7,875,178 B2
(45) Date of Patent: Jan. 25, 2011

(54) WATER QUALITY DRAIN BASIN INSERT

(75) Inventor: Courtney Ashliman, North Logan, UT (US)

(73) Assignee: ADS Structures, Inc., Hilliard, OH (US)

( * ) Notice: Subject to any disclaimer, the term of this patent is extended or adjusted under 35 U.S.C. 154(b) by 0 days.

(21) Appl. No.: 11/346,837

(22) Filed: Feb. 6, 2006

(65) Prior Publication Data

US 2007/0181486 A1    Aug. 9, 2007

(51) Int. Cl.
*E03F 5/14* (2006.01)
*B01D 35/02* (2006.01)
*B01D 35/30* (2006.01)
B01D 24/00 (2006.01)
B01D 35/00 (2006.01)

(52) U.S. Cl. .................... 210/323.1; 210/342; 210/163; 210/451; 210/455; 210/477; 210/317; 210/482; 210/489; 210/497.3; 210/691; 210/484

(58) Field of Classification Search ........................ None
See application file for complete search history.

(56) References Cited

U.S. PATENT DOCUMENTS

| | | | | |
|---|---|---|---|---|
| 748,230 | A | * | 12/1903 | Stout .......................... 210/266 |
| 2,317,707 | A | * | 4/1943 | Yavitch ......................... 4/292 |
| 3,385,039 | A | * | 5/1968 | Burke et al. .................. 55/501 |
| 4,492,491 | A | * | 1/1985 | Lunden et al. ............... 405/119 |
| 4,683,057 | A | * | 7/1987 | Krause et al. ................ 210/342 |
| 5,820,762 | A | | 10/1998 | Bamer et al. |
| 5,897,787 | A | * | 4/1999 | Keller ......................... 210/767 |
| 5,985,157 | A | | 11/1999 | Leckner et al. |
| 6,086,758 | A | | 7/2000 | Schilling et al. |
| 6,231,758 | B1 | | 5/2001 | Morris et al. |
| 6,287,459 | B1 | | 9/2001 | Williamson |
| 6,306,293 | B1 | * | 10/2001 | Schilling et al. ............. 210/164 |
| 6,485,639 | B1 | | 11/2002 | Gannon et al. |
| 6,531,059 | B1 | | 3/2003 | Morris et al. |
| 6,537,446 | B1 | * | 3/2003 | Sanguinetti .................. 210/163 |
| 6,551,023 | B2 | | 4/2003 | Allard |
| 6,562,233 | B1 | * | 5/2003 | Schilling et al. ............. 210/485 |
| 6,609,852 | B2 | * | 8/2003 | Wimberger .................. 210/163 |
| 2003/0127380 | A1 | | 7/2003 | Morris et al. |
| 2003/0146144 | A1 | * | 8/2003 | Votel ........................... 210/232 |

* cited by examiner

*Primary Examiner*—Krishnan S Menon
*Assistant Examiner*—Madeline Gonzalez
(74) *Attorney, Agent, or Firm*—Finnegan, Henderson, Farabow, Garrett & Dunner, LLP

(57) ABSTRACT

A drain basin insert having a housing, with the housing having a sidewall having a top edge and a bottom edge, and with the housing having a perforated base member secured to the sidewall at the lower edge of the sidewall, and with the housing having an outwardly extending flange at the top edge of the sidewall. The insert also includes a secondary filter means having a permeable container having hydrophobic filter media therein. The insert also has a perforated, rigid structural member having a bottom wall and a raised portion, with the raised portion attached to the bottom wall and extending upwardly therefrom. The insert also has a primary filter means having an outer sidewall, a bottom surface, and a central portion, with the bottom surface contacting the bottom wall of the perforated structural member, and with the central portion contacting the raised portion of the perforated structural member. The housing sidewall also has an interior lip extending inwardly therefrom located intermediate the bottom and top edges.

15 Claims, 9 Drawing Sheets

WATER QUALITY DRAIN BASIN INSERT

BACKGROUND OF THE INVENTION

1. Field of the Invention

This invention relates generally to drain basin inserts, and more particularly to such drain basin inserts that significantly improve the water quality of the water which passes therethrough.

2. Description of the Related Art

This invention is directed to the providing of a drain basin for use with storm sewers. Phase II of EPA's National Discharge Elimination System (NPDES) requires all but the smallest municipal and industrial storm sewer systems to treat storm water discharge to the "maximum extent practicable". Consequently, the quality of storm water ultimately discharged into storm sewer systems must now meet higher standards than in recent years past. Two pollutants of major concern are sediments and oils that flow into sewer drains during storms, in addition to metals, such as zinc, and nitrogen and phosphorous-containing compounds.

Some attempts have already been made to address this problem. They include the devices shown in U.S. Pat. Nos. 5,820,762 and 6,217,757, marketed by Hydro Compliance Management of Brighton, Mich. and Revel Environmental Manufacturing known as REM Filters respectively. Another product designed to address the problem is Aquaguard marketed by Aquashield Inc. of Chattanooga, Tenn.

Several patents of interest include Schilling et al, U.S. Pat. No. 6,086,758, which discloses a filtering device for use in storm drains; Leckner et al, U.S. Pat. No. 5,985,157, which discloses a filter device for removing suspended solids from storm water; Bamer et al, U.S. Pat. No. 5,280,762, which discloses a filter insert for a storm drain; Fleischmann, U.S. Pat. No. 6,217,757, which discloses a storm drain filter with vertical screens; Morris et al, U.S. Pat. No. 6,231,758, which discloses a curb-inlet storm drain system for filtering trash and hydrocarbons; Gannon et al, U.S. Pat. No. 6,485,630, which discloses a separation of hydrocarbons from a hydrocarbon-containing liquid; and Allard, U.S. Pat. No. 6,551,023, which discloses a soft bodied high capacity catch basin filtration system.

It is thus apparent that the need exists for a drain basin insert which discharges water that has its quality significantly improved, and that can be easily cleaned of sediment, debris, and hydrocarbons and oil-bound pollutants.

SUMMARY OF THE INVENTION

In accordance with the present invention, there is disclosed a drain basin insert having a housing, with the housing having a sidewall having a top edge and a bottom edge, and with the housing having a perforated base member secured to the sidewall at the lower edge of the sidewall, and with the housing having an outwardly extending flange at the top edge of the sidewall. The insert also includes a secondary filter means having a permeable container having hydrophobic filter media therein. The insert also has a perforated, rigid structural member having a bottom wall and a raised portion, with the raised portion attached to the bottom wall and extending upwardly therefrom. The insert also has a primary filter means having an outer sidewall, a bottom surface, and a central portion, with the bottom surface contacting the bottom wall of the perforated structural member, and with the central portion contacting the raised portion of the perforated structural member.

The sidewall has an interior lip extending inwardly therefrom located intermediate the bottom edge and the top edge, with the bottom wall of the perforated structural member contacting the lip. In one embodiment of the invention, the perforated structural member has a grasping portion extending therefrom. Preferably, the insert includes a transition plate having a top surface contacting the flange at the top edge of the housing, with the perforated structural member being spaced a distance below the transition plate.

The preferred embodiment of the invention has a primary filter means retainer having a first portion, a second portion having a downwardly extending sidewall, and an aperture, with the insert being directly above the primary filter means in contacting relationship therewith. The insert has two compartments, the primary filter means being in the first compartment and the secondary filter means being in the second compartment. The housing also has at least one overflow slot located in the housing sidewall intermediate the raised portion of the perforated structural member and the housing sidewall top edge. The filter media in the secondary filter means actively bonding to hydrocarbons. In one modified embodiment of the invention, a spacer member is located atop the perforated structural member and directly adjacent the housing sidewall.

The primary objective of this invention is to provide a drain basin insert that facilitates the discharge of relatively clean water. Important aspects of this objective are providing a drain basin insert that can filter out sediment and debris, as well as filter out hydrocarbons and oil-bound pollutants.

Another objective of this invention is to provide such a drain basin insert that can be used in manholes with most industry-standard drainage inlets.

Other objects and advantages of the invention will be apparent from the following description, the accompanying drawings and the appended claims.

Figure 1:
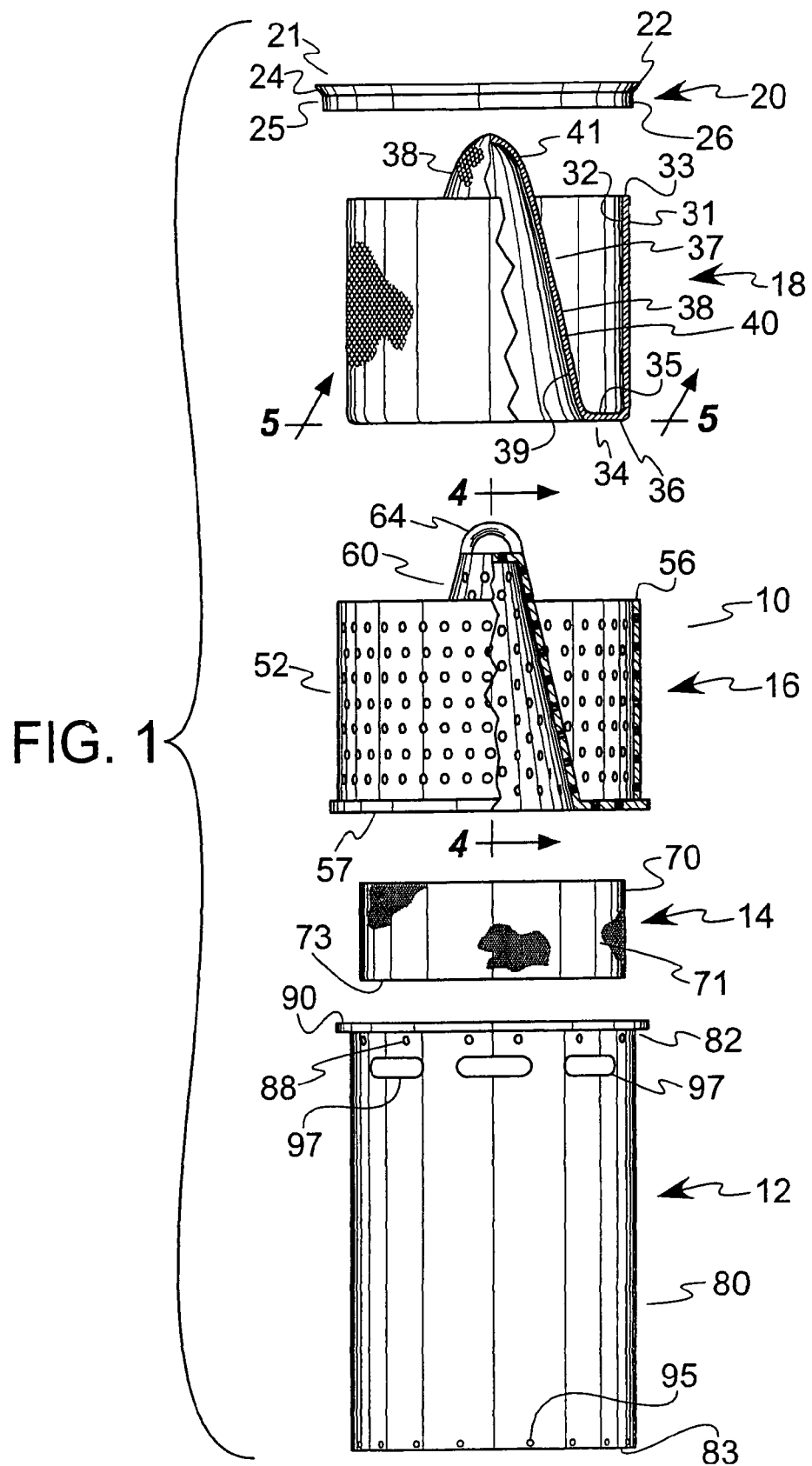
FIG. 1 is an exploded schematic view of a drain basin insert made in accordance with the present invention, but shown in part as a vertical sectional view.

In describing the preferred and modified embodiments of the invention which are illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Having reference to the drawings, attention is directed first to FIG. 1, which discloses a catch basin insert made in accordance with the invention designated generally by the numeral 10. The catch basin insert 10 disclosing the preferred embodiment of the invention includes an insert housing 12, a bulk filter insert 14, a catch basket 16, a filter bag 18, and a bag retainer 20.

Figure 2:
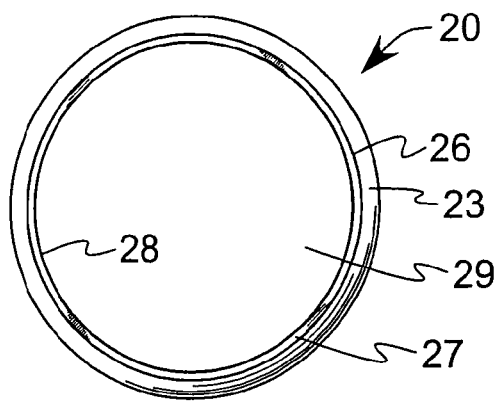
FIG. 2 is a bottom plan view of the top component of the device shown in FIG. 1.
Figure 3:
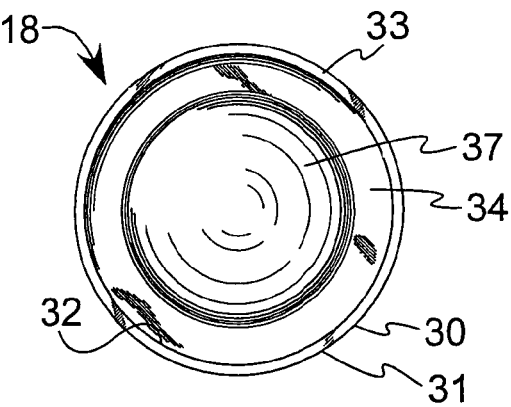
FIG. 3 is a top plan view of the component of the device shown in FIG. 1 directly adjacent to the top component.
Figure 9:
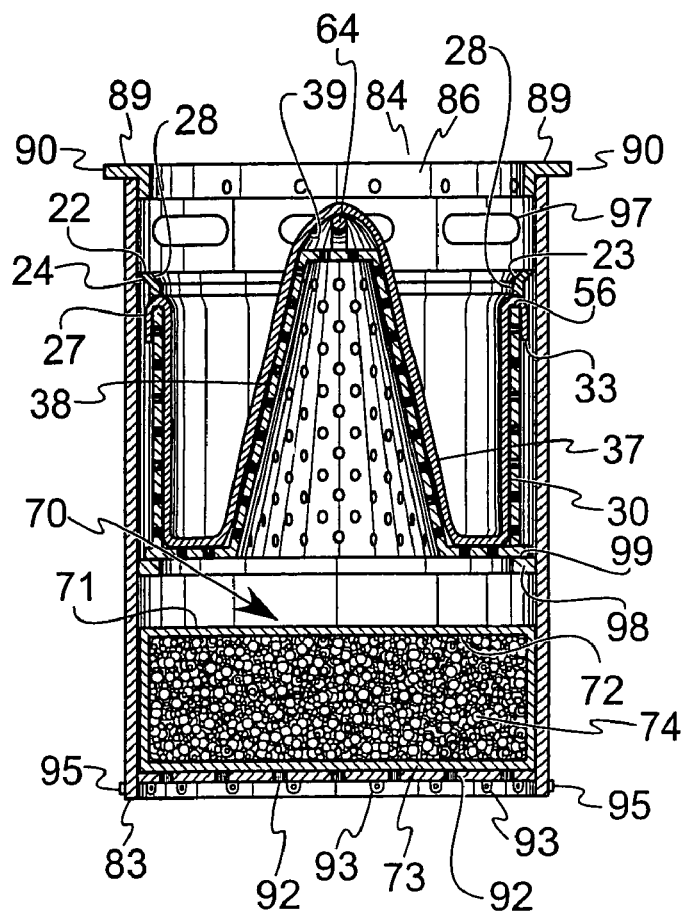
FIG. 9 is a vertical sectional view similar to FIG. 7, but showing the invention when assembled.

Turning first to the bag retainer 20, as can best be appreciated from a comparison of FIGS. 1, 2, and 9, it has a first portion 21 having a top peripheral surface 22, an upper beveled surface 23, and a lower beveled surface 24, and a second portion 25 having an outer sidewall 26, a bottom edge 27, and an inner sidewall 28. The top peripheral surface 22 is at the juncture of the upper beveled surface 23 and lower beveled surface 24. The outer sidewall 26 extends from the lower edge of the lower beveled surface 24 to the bottom edge 27. Similarly, the inner sidewall 28 extends from the lower edge of the upper beveled surface 23 to the bottom edge 27, with the inner sidewall 28 preferably being parallel to the outer sidewall 26. Additionally, an aperture 29 is formed in the center of the bag retainer 20. The bag retainer is preferably fabricated from neoprene, although it could be fabricated from a plastic, rubber, or similar material.

As can best be appreciated from a comparison of FIGS. 1, 2, and 9, the filter bag is permeable. This can be because the bag is woven or because it has perforations, either case permitting the passage of liquids therethrough. Preferably, the filter bag 18 is made from a woven geotextile fabric such as a woven polypropylene monofilament material. The bag has an outer sidewall 30 with a first surface 31, a second surface 32, and a top edge 33. The bag also has a bottom portion 34 with an upper surface 35 and a lower surface 36, and also a central portion 37 having an exterior surface 38 and an interior surface 39. The bottom portion has its inner and outer edges connected to the central portion and outer sidewall, respectively, and does not extend beneath the central portion. Further, the central portion rises a distance above the bottom portion, however, in the preferred embodiment of the invention, its height is not as great as the height of the outer sidewall.

Figure 4:
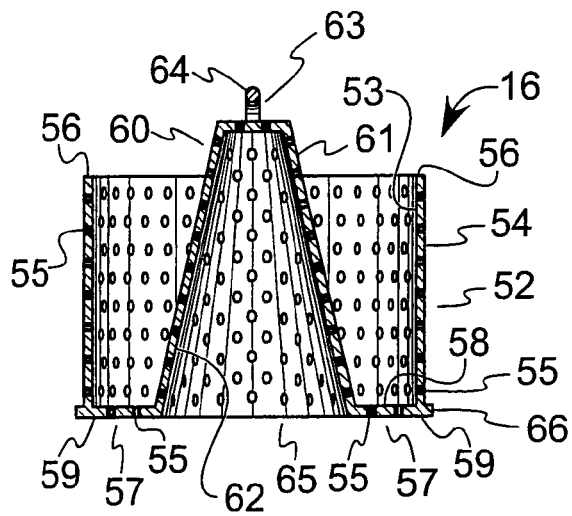
FIG. 4 is a vertical sectional view taken along line 4-4 of FIG. 1.
Figure 5:
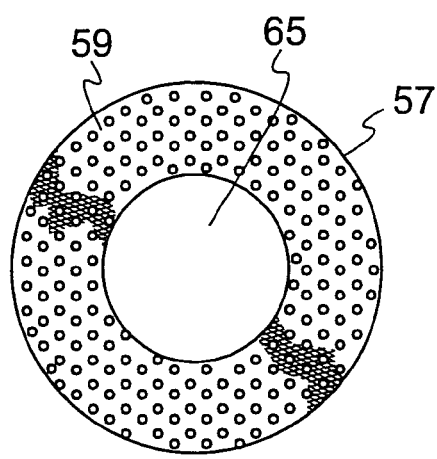
FIG. 5 is a horizontal sectional view taken along line 5-5 of FIG. 1.

A comparison of FIGS. 1, 4, and 9 discloses the structure of the catch basket 16. It has an outer wall 52, having an inner surface 53 and an outer surface 54, preferably parallel to one another. The outer wall 52 also has a plurality of perforations 55 formed therein to permit the passage of liquid therethrough from inside the catch basket to the outside of the catch basket in case of overflow and where the liquid level inside the catch basket is high enough to enter such perforations 55. Liquid which passes through perforations 55 enters a channel that can be readily ascertained in FIG. 9 as being located between the outer surface 54 of the catch basket and the inner wall 81 of the insert housing 80. The outer wall also has a top edge 56.

The catch basket also has a bottom wall 57, having an upper surface 58 and a lower surface 59, preferably parallel to one another. Finally, it has a raised portion 60, having an exterior surface 61 and an interior surface 62. As shown, the raised portion resembles a truncated cone, but it should be appreciated that the shape could vary, such as being more pointed, rounded or of a cylindrical shape. The bottom wall preferably has a catch basin aperture 65 formed in the region beneath the raised portion. The bottom wall 57 also has a peripheral edge 66 directly adjacent the outer wall. The raised portion also has a top 63, which in this embodiment of the invention has a grasping element 64, such as a handle projecting upwardly therefrom.

Figure 6:
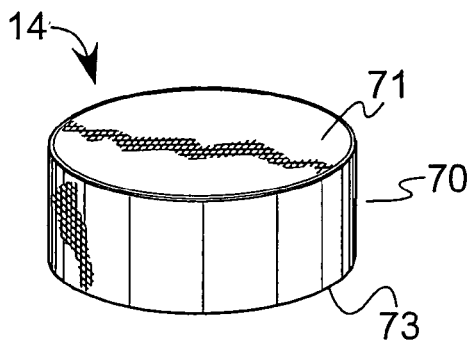
FIG. 6 is a perspective view of the component of the device shown in FIG. 1 which is directly adjacent the lowermost component.
Figure 7:
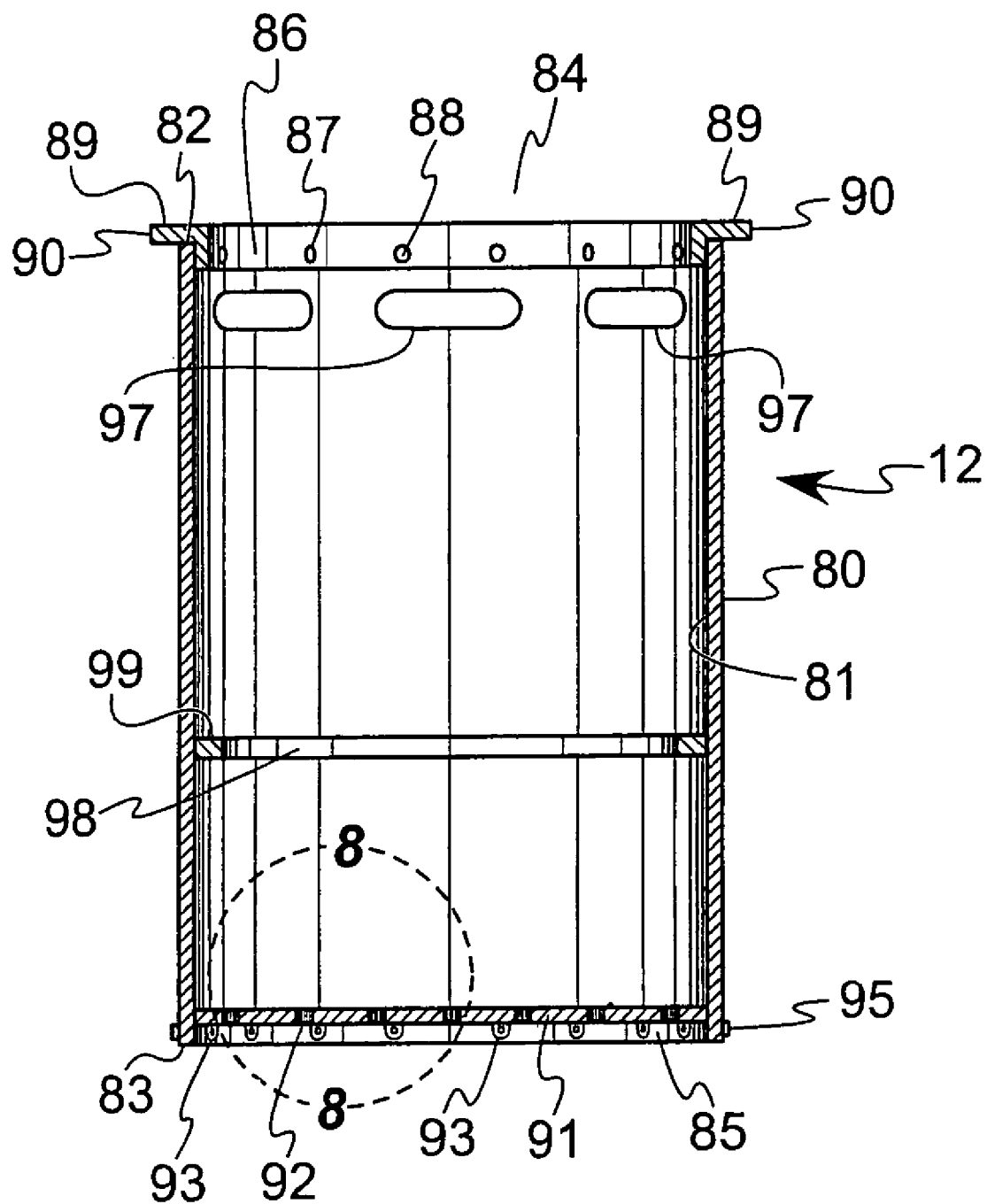
FIG. 7 is a vertical sectional view of the lowermost component of the device shown in FIG. 1 taken through its center.
Figure 8:
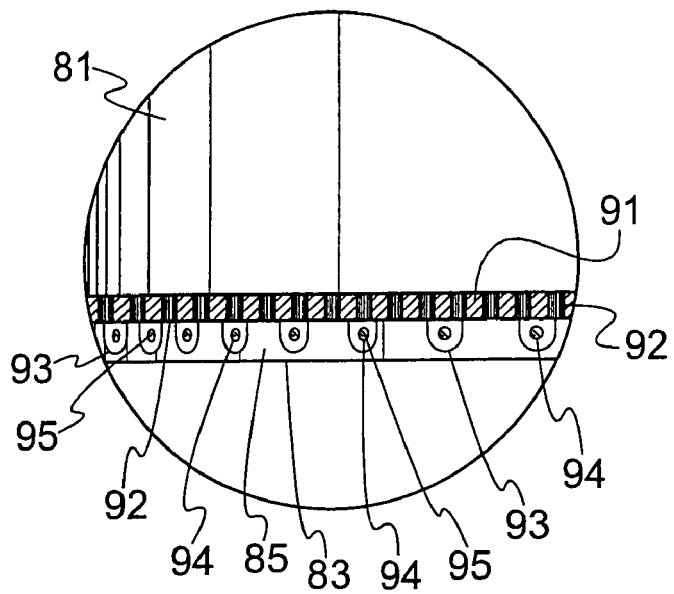
FIG. 8 is a greatly enlarged view of the area within line 8-8 of FIG. 7.

The bulk filter insert 14 associated with this invention can best be appreciated from a comparison of FIGS. 1, 6, and 9. It too has a permeable housing 70, such as burlap, although other woven fabrics, or even plastic with small perforations could be used. The permeable housing has an outer surface 71 and an inner surface 72. The bag 18 has a bottom 73. Inside the filter bag 18 is a filter media.

One such media is MYCELX Permakleen, a product of Mycelx Technologies Corporation of Gainesville, Ga., a primarily polypropylene material infused with a polymer compound to which hydrocarbons actively bond. MYCELX is formed as a systhesis product of natural drying, semi-drying, and non-drying oils with a synthetic polymer and is described more fully in U.S. Pat. Nos. 5,437,793 and 5,746,925. The polymer is infused and cured into a variety of substrates (i.e. filter cartridges and absorbent materials) so that it is homogeneously dispersed throughout the base material. When hydrocarbon compounds come into contact with the polymer, they are dissolved and bonded to, and will not re-disperse or emulsify into water. Permakleen is extremely hydrophobic and will not absorb water. Typically while oil sorbents and filters absorb many times their weight in water, Permakleen only absorbs hydrocarbon based pollutants, so that when saturated, only the Permakleen and the pollutant are left. Additionally, Permakleen is non-hazardous, non-toxic, and declared compliant to section 300.915 of the NCP by the U.S. EPA. Permakleen is easily disposed of by incineration. In many cases, petroleum saturated Permakleen can be land filled with other petroleum saturated materials.

A comparison of FIGS. 1, 7, 8, and 9 discloses the details of the insert housing 12. It has an outer wall 80, and inner wall 81, top edge 82 and bottom edge 83. Directly adjacent to the top edge 82 is an upper support ring 84 which assists in providing stability to the insert housing 12. Meanwhile, near the bottom edge 83 is a lower support ring 85, which also assists in providing stability to the insert housing. With respect to the upper support ring 84, it can be appreciated as having a housing attachment portion 86 having a plurality of apertures 87 therein, which apertures also extend through the outer wall 80 so as to permit securing of the upper support ring 84 to the outer wall 80 by fasteners 88. The upper support ring also has a flange portion 89 having a flange peripheral edge 90. The flange portion 89 thus extends outwardly from the outer wall.

Attached to the lower support ring and outer wall is a base member 91, which can be a perforated plate. In addition to having a plurality of perforations 92 formed therein, the base member 91 also has a number of tabs 93 which have apertures 94 formed therein which apertures also extend through the outer wall 80 so as to permit securing of the lower support ring 85 to the outer wall 80 by fasteners 95. These tabs 93 are perpendicular to the base member 91. Preferably both the upper support ring and the lower support ring are fabricated from stainless steel, although other metals or plastics could be used.

The insert housing 12 also has several overflow slots 97 positioned near the top of the insert housing in case of extremely high flow rates. Additionally, an interior lip 98 with an upper surface 99 projects inwardly from the inner wall 81 a distance above the base member that is greater than the height of the filter bag, and a distance below the top edge 82 of the insert housing 12 which is greater than the height of the catch basket 16.

When assembled, the preferred embodiment of the invention looks as shown in FIG. 9. It is a two compartment catch basin insert that can fit into new or existing catch basins. The upper section consists of a perforated, preferably metal, catch basket that is covered by a filter bag, preferably fabricated from a woven geotextile, although the catch basket could be fabricated from other materials. This portion of the invention catches debris and sediment, while allowing liquids to pass freely down through the bottom wall and central portion via the apertures. Additional liquid may pass through the apertures in the outer wall 52, especially if sediment reduces the rate of liquid flow through the bottom wall 57. As mentioned above, should the rate of flow become too high, overflow can flow through the overflow slots and downwardly over the outer wall 80 of the insert housing.

The bulk filter insert 14 is placed atop the base member 91 at the bottom of the insert housing 12. The catch basket 16 is then placed atop the interior lip 98 in the interior of the insert housing. The catch basket is then draped with the filter bag 18, so that the first surface 31 of the bag 18 is directly adjacent the inner wall 81 of the catch basket, the bottom portion 34 of the bag is directly adjacent the bottom wall 57 of the catch basket, and the interior surface 39 of the bag is directly adjacent the exterior surface 61 of the raised portion 60. The top edge 33 of the bag is then folded over the top edge 56 of the outer wall of the catch basket, and the bag retainer 20 is then placed atop the folded portion of the bag as shown in FIG. 9. The bag retainer's top peripheral surface 22 is just slightly less in diameter than the inside of the insert housing, so that effectively all debris and sediment are deposited into the filter bag upon flowing into the insert housing.

Next, FIGS. 10-17 disclose a modified embodiment of the invention designated generally by the numeral 110. The catch basin insert 110 disclosing this modified embodiment of the invention includes an insert housing 112, a bulk filter insert 114, an inverted perforated cone 116, a spacing member 117, and a filter bag 118.

Figure 10:
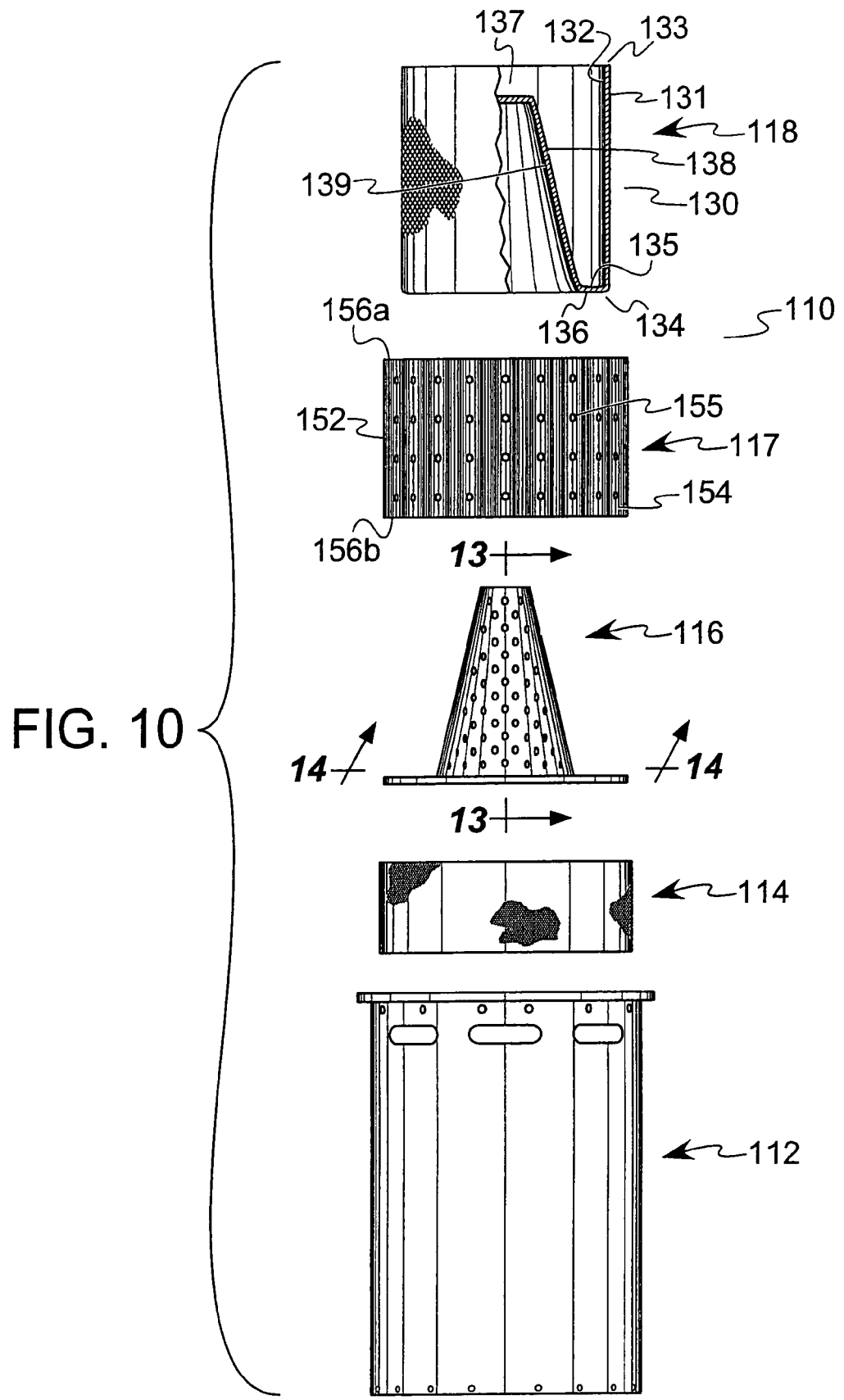
FIG. 10 is an exploded schematic view of a drain basin insert made in accordance with a modified embodiment of the present invention, but shown in part as a vertical sectional view.
Figure 11:
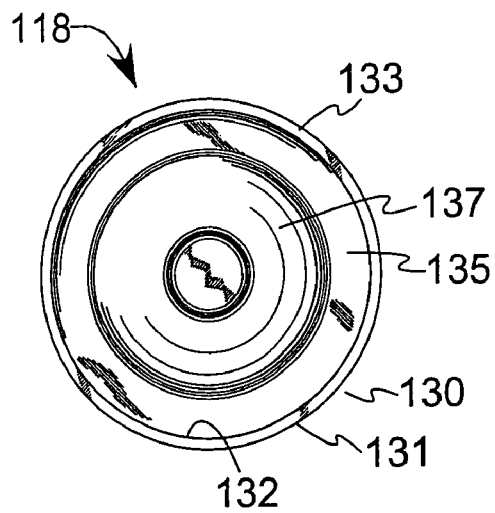
FIG. 11 is a top plan view of the top component of the device shown in FIG. 10.
Figure 17:
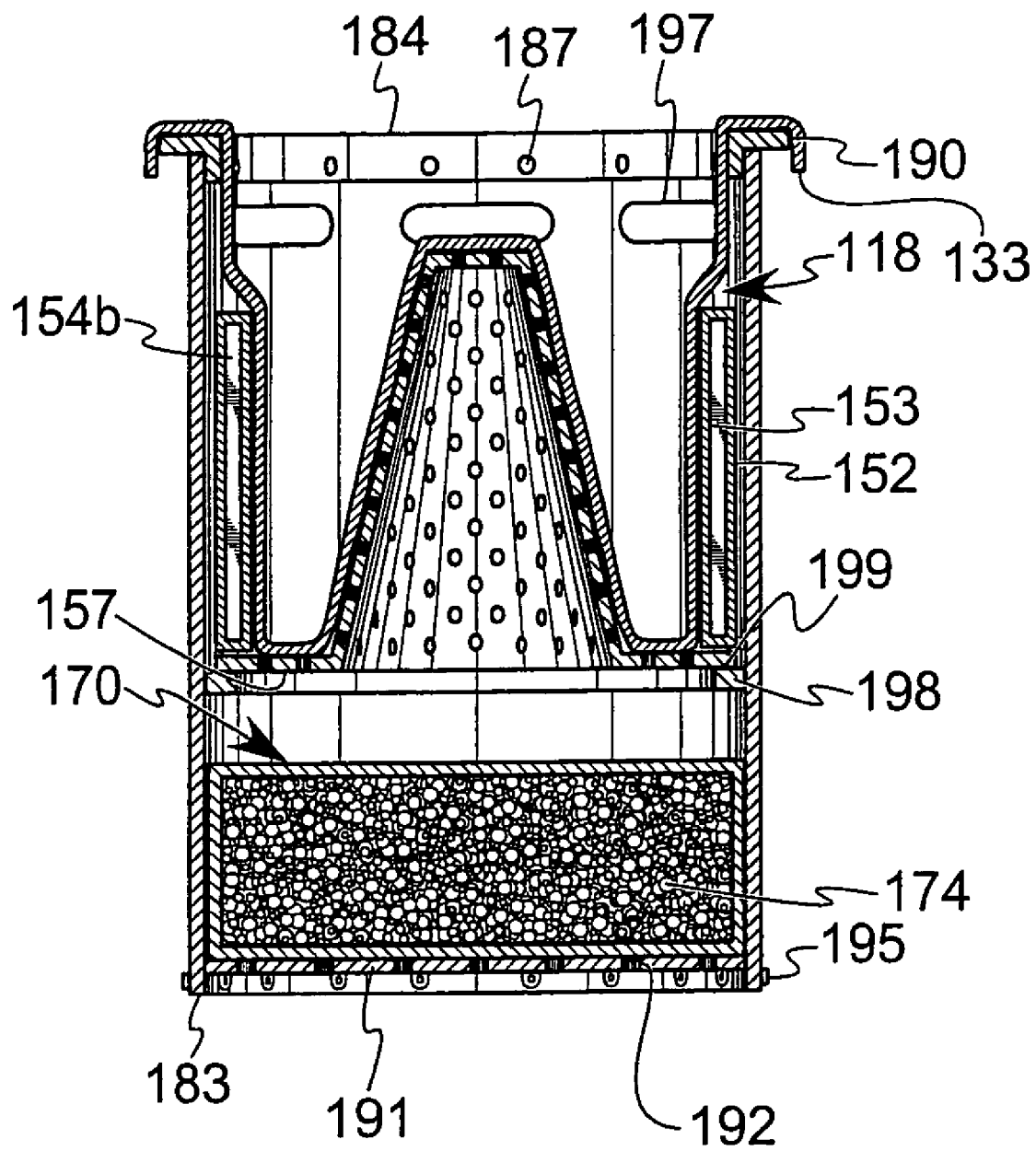
FIG. 17 is a vertical sectional view similar to FIG. 16, but showing the invention when assembled.

As can best be appreciated from a comparison of FIGS. 10, 11, and 17, the filter bag 118 is permeable. Once again, this can be because the bag is woven or because it has perforations, either case permitting the passage of liquids therethrough. Preferably, the filter bag 118 is made from a woven geotextile fabric such as a woven polypropylene monofilament material. The bag has an outer sidewall 130 with a first surface 131, a second surface 132, and a top edge 133. The bag also has a bottom portion 134 with an upper surface 135 and a lower surface 136, and also a central portion 137 having an exterior surface 138 and an interior surface 139. The bottom portion has its inner and outer edges connected to the central portion and outer sidewall, respectively, and does not extend beneath the central portion. Further, the central portion rises a distance above the bottom portion, and, in the preferred embodiment of the invention, its height is just slightly greater than that of the outer sidewall.

Figure 12:
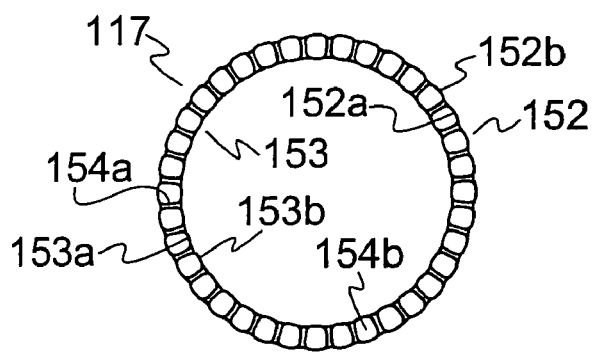
FIG. 12 is a top plan view of the component of the device shown in FIG. 10 directly adjacent to the top component.
Figure 13:
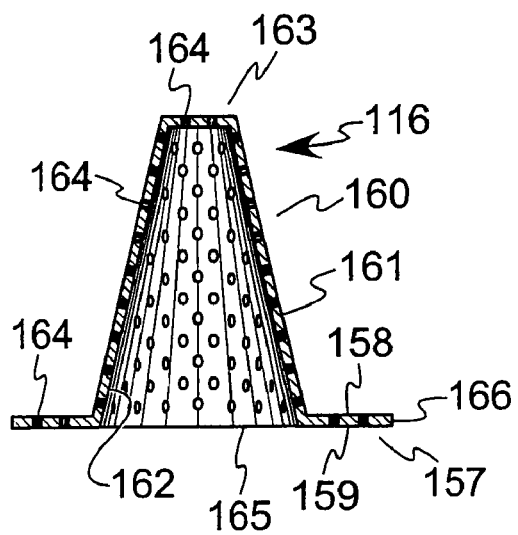
FIG. 13 is a vertical sectional view taken along line 13-13 of FIG. 10.
Figure 14:
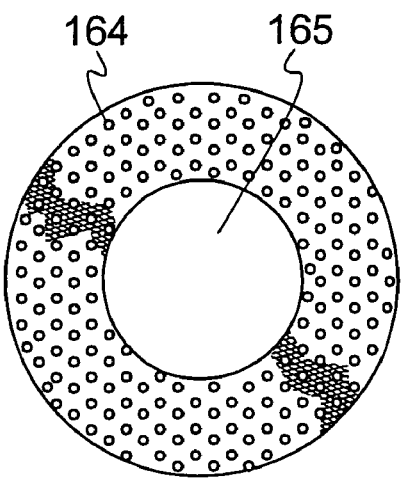
FIG. 14 is a horizontal sectional view taken along line 14-14 of FIG. 10.
Figure 15:
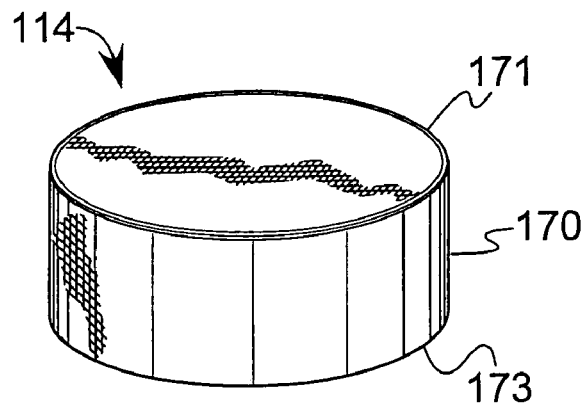
FIG. 15 is a perspective view of the component of the device shown in FIG. 10 which is directly adjacent the lowermost component.

A comparison of FIGS. 10, 12 and 17 better disclose the structure of the spacing member 117. It has an outer wall 152, having an interior surface 152*a* and an exterior surface 152*b*, spaced apart from one another. There is preferably also an inner wall 153, having an interior surface 153*a* and an exterior surface 153*b*. The spacing member 117 also has a plurality of perforations 155 formed therein to permit the passage of liquid through the walls of the spacing member and thereafter downwardly adjacent the inner wall of the insert housing. The purpose of the spacing member 117 is to keep the filter bag 118 from clinging to the interior wall of the insert housing, thereby decreasing the rate of overflow that can enter the storm drain.

The inner and outer walls of the spacing member 117 are connected by a plurality of interconnecting members 154*a*. Also, the spacing member has no top or bottom surfaces, thus a plurality of vertical channels 154*b* are formed between the walls 152 and 153, and adjacent interconnecting members.

A comparison of FIGS. 10, 13, 14, and 17 discloses the structure of the inverted perforated cone 116. The inverted cone 116 has a bottom wall 157, having an upper surface 158 and a lower surface 159, preferably parallel to one another. Additionally, it has a raised portion 160, having an exterior surface 161, an interior surface 162, and a top 163. The bottom wall preferably has a relatively large aperture 165 formed in the region beneath the raised portion. The bottom wall 57 also has a peripheral edge 166. The inverted cone also has a plurality of perforations 164.

The bulk filter insert 112 associated with this invention can best be appreciated from a comparison of FIGS. 1, 11, and 17. It too has a permeable housing 170, such as burlap, although other woven fabrics, or even plastic with small perforations could be used. The permeable housing has an outer surface 171 and an inner surface 172. The bag 118 also has a bottom 173. Inside the filter bag 118 is a filter media of the type described above with respect to the embodiment of the invention disclosed in FIGS. 1-10.

Figure 16:
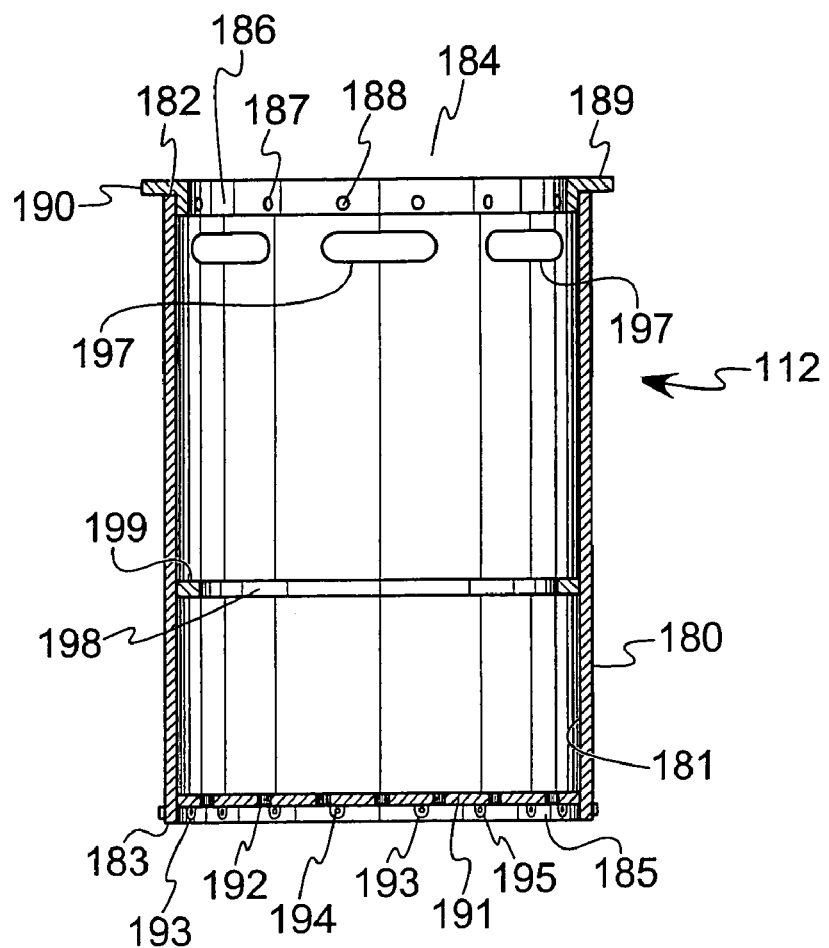
FIG. 16 is a vertical sectional view of the lowermost component of the device shown in FIG. 10 taken through its center.

A comparison of FIGS. 10, 16, and 17 discloses the details of the insert housing 112. It has an outer wall 180, and inner wall 181, top edge 182 and bottom edge 183. Directly adjacent to the top edge 182 is an upper support ring 184 which assists in providing stability to the insert housing 112. Meanwhile, near the bottom edge 183 is a lower support ring 185, which also assists in providing stability to the insert housing. With respect to the upper support ring 184, it can be appreciated as having a housing attachment portion 186 having a plurality of apertures 187 therein, which apertures also extend through the outer wall 180 so as to permit securing of the upper support ring 184 to the outer wall 180 by fasteners 188. The upper support ring also has a flange portion 189 having a flange peripheral edge 190. The flange portion 189 thus extends outwardly from the outer wall.

Attached to the lower support ring and outer wall is a base member 191, which can be a perforated plate. In addition to having a plurality of perforations 192 formed therein, the base member 191 also has a number of tabs 193 which have apertures 194 formed therein which apertures also extend through the outer wall 180 so as to permit securing of the lower support ring 185 to the outer wall 180 by fasteners 195. These tabs 193 are perpendicular to the base member 191. Preferably both the upper support ring and the lower support ring are fabricated from stainless steel, although other metals or plastics could be used.

As can be seen in FIGS. 16 and 17, the insert housing 112 associated with the modified embodiment of the invention also has several overflow slots 197 positioned near the top of the insert housing in case of extremely high flow rates. Additionally, an interior lip 198 with an upper surface 199 projects inwardly from the inner wall 181 a distance above the base member that is greater than the height of the filter bag, and a distance below the top edge 182 of the insert housing 112 which is greater than the height of the inverted perforated cone 116.

When assembled, this modified embodiment of the invention looks as shown in FIG. 17. It too is a two compartment catch basin insert that can fit into new or existing catch basins. The upper section consists of a perforated, preferably metal, inverted perforated cone and a spacing ring, preferably made of polyethylene or a similar material, that are covered by a filter bag, preferably fabricated from a woven geotextile, although the catch basket could be fabricated from other materials. Once again, this portion of the invention catches debris and sediment, while allowing liquids to pass freely down through the bottom wall and central portion via the apertures. Additional liquid may pass through the apertures in the spacing member, especially if sediment reduces the rate of liquid flow through the bottom wall of the inverted conical member. As mentioned above, should the rate of flow become too high, overflow can flow through the overflow slots and downwardly over the outer wall 180 of the insert housing.

The bulk filter insert 114 is placed atop the base member 191 at the bottom of the insert housing 112. The inverted perforated cone 116 is then placed atop the interior lip 198 in the interior of the insert housing, and the spacer member is then placed atop the bottom wall of the inverted perforated cone. The inverted perforated cone and spacer member are then draped with the filter bag 118, so that the first surface 131 of the bag 118 is directly adjacent the inner wall 153 of the spacer member 117, the bottom portion 134 of the bag is directly adjacent the bottom wall 157 of the inverted perforated cone, and the interior surface 139 of the bag is directly adjacent the exterior surface 161 of the raised portion 160. The top edge 133 of the bag is then folded over the top edge 182 of the insert housing 112, or, although not shown, it can be tucked in behind the spacer member so that the top edge is lodged between the spacer member and the insert housing 112.

Figure 18:
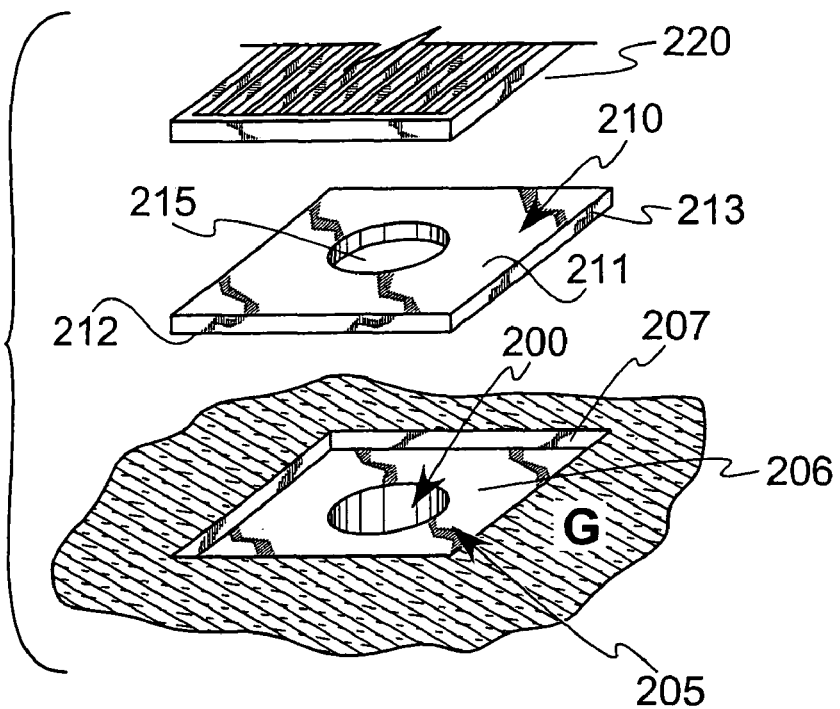
FIG. 18 is a partial perspective view of a site where the invention is used.
Figure 19:
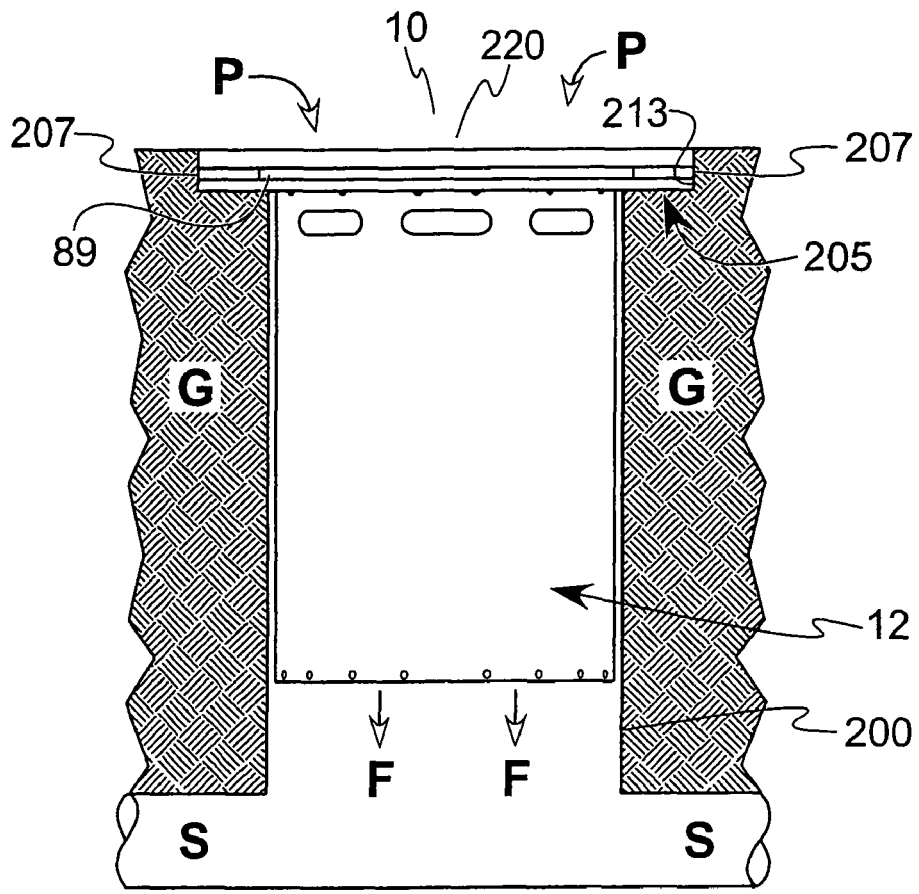
FIG. 19 is a schematic of the invention shown in actual use.

Regardless of which embodiment of the invention is used, FIGS. 18 and 19 provide additional information about how the invention is actually used. For example, by way of illustration, comparing FIGS. 18 and 19 disclose that a manhole 200 is depicted as being located in ground G. At the location where the drain is to be installed, a drain grate recess 205 is formed as is well known in the art. The dimensions of this recess are just slightly greater than the size of the grate to be installed. The drain grate recess 205 has a bottom surface 206 and sidewalls 207.

Into this recess, a transition plate 210 is placed. The transition plate 210 has a peripheral shape which approximates the configuration of the recess, but is slightly less in dimensions so as to fit within the recess. The transition plate has an upper surface 211, a lower surface 212, sidewall 213, and a transition plate aperture 215 of a size approximately the diameter of the manhole, but in any case just slightly greater than the diameter of the drain insert of the invention.

The drain insert is lowered into the aperture in the transition plate until the lower surface of the flange peripheral edge of the upper support ring rests on the top surface of the transition plate. The insert is thus suspended in the manhole as shown. The grate 220 is then put into place in the drain grate recess, thus further retaining the insert in the manhole. Any polluted fluids P which subsequently flow over the grate are caused to enter the insert. As the fluids P flow downwardly, they deposit any debris and sediment in the filter bag. Then, the fluids flow through the bulk filter insert containing the filter media which removes almost all of the petroleum-based pollutants from the water, resulting in filtered fluids F entering the storm sewer system S.

In tests comparing drain basin influent and effluent, the drain basin insert of this invention has demonstrated a remarkable ability to treat storm water discharge. Test results have achieved a removal rate of total suspended solids of over 95%. Test results have also demonstrated a removal rate of total petroleum hydrocarbons of over 90%. Test results have also demonstrated a removal rate of zinc, nitrogen, and phosphorous of over 85%, 65%, and 70% respectively.

Tests have also shown that the drain insert made in accordance with the invention has a maximum flow rate through the filtering means at 0 feet of head weir flow of 230 gallons per minute, with the maximum flow rate through the bypass at 0.5 feet of head orifice flow being 1189 gallons per minute. The primary filter, i.e. the filter bag, can accommodate over 150 pounds of sediment and debris, with the primary filter being able to capture particles as small as 0.034 inches (about 838 microns). Meanwhile, the secondary filter, i.e. the bulk filter insert, has been found capable of removing 15 pounds of hydrocarbons of a particle size greater than 0.012 inches (about 300 microns).

The drain basin insert of this invention thus provides a drain basin insert that permits the discharge of relatively clean water. Importantly, the drain basin insert of this invention filters out sediment and debris, as well as filtering out hydrocarbons and oil-bound pollutants. Through the use of the transition plate, drain basin inserts made in accordance with the invention can be used in manholes with most industry-standard drainage inlets, for example whether square, round, or rectangular.

While the form of apparatus herein described constitutes a preferred embodiment and a modified embodiment of the present invention, it is to be understood that the invention is not limited to this precise form of apparatus and that changes may be made therein without departing from the scope of the invention which is defined in the appended claims.

What is claimed is:

1. A catch basin insert comprising
    a housing, said housing having a sidewall having a top edge and a bottom edge, said housing having a perforated base member secured to said sidewall at said bottom edge of said sidewall,
    a perforated structural member having a perforated bottom wall, a perforated sidewall extending upwardly from the perforated bottom wall, and a perforated raised portion, said perforated structural member being rigid, and said perforated raised portion attached to said perforated bottom wall and extending upwardly therefrom to a height above the perforated sidewall,
    a primary filter having an outer sidewall, a bottom surface, and a central portion, said bottom surface contacting said bottom wall of said perforated structural member, said central portion contacting said raised portion of said perforated structural member,
    a secondary filter positioned within the housing below the perforated structural member and the primary filter; and
    a transition plate, said transition plate being a detachable plate that is removable from said insert, said transition plate having a top surface contacting said top edge of said housing, said transition plate having an aperture through which said housing is inserted so as to downwardly depend from said transition plate, said perforated structural member spaced a distance below said transition plate.

2. The insert according to claim 1 wherein
said housing includes an outwardly extending flange at said top edge of said sidewall, and an interior lip projecting inwardly from said housing sidewall intermediate said housing top edge and said housing bottom edge,
said insert includes two compartments, said primary filter being in the first compartment and said secondary filter being in the second compartment, said second compartment being below said bottom surface of said primary filter and below said perforated structural member bottom wall, said second compartment extending from said housing base member upward to said interior lip; and
said bottom wall of said perforated structural member is contacting said interior lip.

3. The insert according to claim 1 wherein said perforated structural member has a grasping portion extending therefrom.

4. The insert according to claim 1 which includes a primary filter retainer having a first portion directly adjacent a portion of said housing sidewall, a second portion having a downwardly extending sidewall, and an aperture, said primary filter retainer being directly above said primary filter in contacting relationship therewith.

5. The insert according to claim 1 wherein said housing has at least one overflow slot, said overflow slot located in said housing sidewall intermediate said raised portion of said perforated structural member and said housing sidewall top edge.

6. The insert according to claim 1 wherein said secondary filter includes a filter media that actively bonds to hydrocarbons.

7. A catch basin insert comprising
a housing, said housing having a sidewall having a top edge and a bottom edge, said housing having a perforated base member secured to said sidewall at said bottom edge of said sidewall, said housing having an outwardly extending flange at said top edge of said sidewall,
a perforated structural member having a perforated bottom wall, a perforated sidewall extending upwardly from the bottom wall, and a perforated raised portion, said perforated structural member being rigid, and said raised portion attached to said bottom wall and extending upwardly therefrom to a height above the perforated sidewall,
a primary filter having an outer sidewall, a bottom surface, and a central portion, said bottom surface contacting said bottom wall of said perforated structural member, said central portion contacting said raised portion of said perforated structural member, said housing having at least one overflow slot, said overflow slot located in said housing sidewall intermediate said raised portion of said perforated structural member and said housing sidewall top edge; and
a transition plate, said transition plate being a detachable plate that is removable from said insert, said transition plate having a top surface contacting said flange at said top edge of said housing, said transition plate having an aperture through which said housing is inserted so as to downwardly depend from said transition plate, said perforated structural member spaced a distance below said transition plate.

8. The insert according to claim 7 wherein said housing sidewall has an interior lip extending inwardly therefrom located intermediate said bottom edge and said top edge, said bottom wall of said perforated structural member contacting said interior lip.

9. The insert according to claim 7 wherein said perforated structural member has a grasping portion extending therefrom.

10. The insert according to claim 7 which includes a primary filter retainer having a first portion directly adjacent a portion of said housing sidewall, a second portion having a downwardly extending sidewall, and an aperture, said primary filter retainer being directly above said primary filter in contacting relationship therewith.

11. The insert according to claim 7 further comprising a secondary filter including a hydrophobic filter media that actively bonds to hydrocarbons.

12. A catch basin insert comprising
a housing, said housing having a sidewall having a top edge and a bottom edge, said housing having a perforated base member secured to said sidewall at said bottom edge of said sidewall, said housing having an interior lip projecting inwardly from said housing sidewall intermediate said housing top edge and said housing bottom edge,
a perforated structural member having a perforated bottom wall, a perforated sidewall extending upwardly from said bottom wall, and a perforated raised portion, said perforated structural member being rigid, and said raised portion attached to said bottom wall and extending upwardly therefrom to a height above the perforated sidewall,
a primary filter having an outer sidewall, a bottom surface, and a central portion, said bottom surface contacting said bottom wall of said perforated structural member, said central portion contacting said raised portion of said perforated structural member, said insert having two compartments, said primary filter being in the first compartment and said secondary filter being in the second compartment, said second compartment being below said bottom surface of said primary filter and below said perforated structural member bottom wall, said second compartment extending from said housing base member upward to said interior lip;
a secondary filter including a permeable container having hydrophobic filter media therein; and
a transition plate, said transition plate being a detachable plate that is removable from said insert, said transition plate having a top surface contacting said flange at said top edge of said housing, said transition plate having an aperture through which said housing is inserted so as to downwardly depend from said transition plate, said perforated structural member spaced a distance below said transition plate.

13. The insert according to claim 12 wherein said bottom wall of said perforated structural member is contacting said interior lip.

14. The insert according to claim 12 wherein said perforated structural member has a grasping portion extending therefrom.

15. The insert according to claim 13 further comprising a channel located between said sidewall of said perforated structural member and said housing sidewall, wherein said channel extends upwardly from said interior bottom wall of said perforated structural member.

* * * * *